United States Patent
Shearer et al.

(10) Patent No.: US 10,918,006 B2
(45) Date of Patent: Feb. 16, 2021

(54) SYSTEM AND METHOD FOR MONITORING MATERIAL ACCUMULATION RELATIVE TO GROUND-ENGAGING TOOLS OF A TILLAGE IMPLEMENT

(71) Applicant: CNH Industrial Canada, Ltd., Saskatoon (CA)

(72) Inventors: Scott Shearer, Hilliard, OH (US); Andrew Klopfenstein, West Jefferson, OH (US); Brittany Schroeder, Cloverdale, OH (US); Philip Root, Columbus, OH (US)

(73) Assignee: CNH Industrial Canada, Ltd., Saskatoon (CA)

( * ) Notice: Subject to any disclaimer, the term of this patent is extended or adjusted under 35 U.S.C. 154(b) by 51 days.

(21) Appl. No.: 16/162,969

(22) Filed: Oct. 17, 2018

(65) Prior Publication Data

US 2020/0120854 A1    Apr. 23, 2020

(51) Int. Cl.
*A01C 7/00*     (2006.01)
*A01B 63/32*    (2006.01)
*A01B 63/112*   (2006.01)

(52) U.S. Cl.
CPC ............ *A01B 63/32* (2013.01); *A01B 63/112* (2013.01); *A01C 7/006* (2013.01)

(58) Field of Classification Search
CPC ........ A01B 63/32; A01B 63/112; A01C 7/006
See application file for complete search history.

(56) References Cited

U.S. PATENT DOCUMENTS

| | | |
|---|---|---|
| 3,608,557 A | 9/1971 | Evans |
| 3,863,428 A | 2/1975 | Baxter |

(Continued)

FOREIGN PATENT DOCUMENTS

| | | | | |
|---|---|---|---|---|
| CN | 107493703 A | * | 12/2017 | |
| WO | WO-2017106874 A1 | * | 6/2017 | ............ A01B 51/02 |
| WO | WO2017158006 | | 9/2017 | |

OTHER PUBLICATIONS

English Translation_CN107493703 (Year: 2017).*
Jodi Dejong-Hughes, Upper Midwest Tillage Guide, University of Minnesota Extension, Tillage Guide Part 2, pp. 9-20.

*Primary Examiner* — Peter D Nolan
*Assistant Examiner* — Ashley L Redhead, Jr.
(74) *Attorney, Agent, or Firm* — Rebecca L. Henkel; Rickard K. DeMille (57) ABSTRACT

A method for reducing material accumulation relative to ground-engaging tools of a tillage implement includes receiving measurement signals from at least one accumulation sensor mounted to the tillage implement during a tillage operation. The measurement signals include a three-dimensional (3D) representation of an environment containing material accumulation relative to a plurality ground-engaging tools. The method also includes estimating an amount of material accumulation relative to the plurality of ground-engaging tools based on the 3D representation. Further, the method includes comparing the amount of material accumulation to an accumulation threshold. The material accumulation threshold is indicative of a given degree of material accumulation relative to the plurality of ground-engaging tools. Thus, based on the comparison between the amount of material accumulation and the accumulation threshold, the method includes controlling an operation of at least one component of the tillage implement to execute a control action for reducing the amount of the material accumulation.

15 Claims, 4 Drawing Sheets

(56) References Cited

U.S. PATENT DOCUMENTS

| | | |
|---|---|---|
| 4,143,664 A | 3/1979 | Chorney |
| 7,354,341 B1 | 4/2008 | Smith |
| 7,452,267 B2 | 11/2008 | Bundy |
| 8,408,149 B2 | 4/2013 | Rylander |
| 9,241,440 B2 | 1/2016 | Roberge |
| 9,405,039 B2 | 8/2016 | Anderson |
| 9,485,900 B2 | 11/2016 | Connell et al. |
| 9,554,098 B2 | 1/2017 | Casper et al. |
| 9,668,399 B2 | 6/2017 | Gates |
| 2004/0093841 A1 | 5/2004 | Clauss |
| 2006/0246966 A1 | 11/2006 | Smith |
| 2008/0234017 A1 | 9/2008 | Bundy |
| 2014/0303854 A1 | 10/2014 | Zielke |
| 2015/0296701 A1* | 10/2015 | Anderson ............... A01B 71/08 172/2 |
| 2016/0088787 A1 | 3/2016 | Connell et al. |
| 2017/0055444 A1 | 3/2017 | Mahieu et al. |
| 2017/0112043 A1 | 4/2017 | Nair et al. |
| 2018/0049361 A1 | 2/2018 | Zemenchik |
| 2018/0114305 A1 | 4/2018 | Strnad et al. |

\* cited by examiner

SYSTEM AND METHOD FOR MONITORING MATERIAL ACCUMULATION RELATIVE TO GROUND-ENGAGING TOOLS OF A TILLAGE IMPLEMENT

FIELD

The present subject matter relates generally to tillage implements and, more particularly, to a system and method for monitoring material accumulation, such as residue flow, relative to ground-engaging tools of a tillage implement.

BACKGROUND

Crop residue generally refers to the vegetation (e.g., straw, chaff, husks, cobs) remaining on the soil surface following the performance of a given agricultural operation, such as a harvesting operation or a tillage operation. For various reasons, it is important to maintain a given amount of crop residue within a field following an agricultural operation. Specifically, crop residue remaining within the field can help in maintaining the content of organic matter within the soil and can also serve to protect the soil from wind and water erosion. However, in some cases, excessive amounts of residue can cause plugging of the ground-engaging tools of the implement. In addition, leaving an excessive amount of crop residue within a field can have a negative effect on the soil's productivity potential, such as by slowing down the warming of the soil at planting time and/or by slowing down seed germination.

As such, the ability to monitor the amount of residue accumulation and/or residue flow within a field can be very important to maintaining a healthy, productive field, particularly when it comes to performing tillage operations. Accordingly, an improved system and method for monitoring material accumulation, such as residue flow, relative to the ground-engaging tools of a tillage implement that overcomes one or more of the issues in the prior art would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a method for reducing material accumulation relative to ground-engaging tools of a tillage implement. The method includes receiving measurement signals from at least one accumulation sensor mounted to the tillage implement during a tillage operation. The measurement signals include a three-dimensional (3D) representation of an environment containing material accumulation relative to one or of the ground-engaging tools. The method also includes estimating an amount of material accumulation relative to the plurality of ground-engaging tools based on the 3D representation. Further, the method includes comparing the amount of material accumulation to an accumulation threshold. The material accumulation threshold is indicative of a given degree of material accumulation relative to the plurality of ground-engaging tools. Thus, based on the comparison between the amount of material accumulation and the accumulation threshold, the method includes controlling an operation of at least one component of the tillage implement to execute a control action for reducing the amount of the material accumulation.

In another aspect, the present disclosure is directed to a system for reducing material accumulation relative to ground-engaging tools when performing a tillage operation. The system includes an implement having a frame and a plurality of ground-engaging tools supported on the frame, at least one accumulation sensor mounted to the implement, and a controller. The controller includes a processor and associated memory. The memory includes instructions that, when implemented by the processor, configure the controller to perform one or more operations, including but not limited to receiving measurement signals from the at least one accumulation sensor during the tillage operation, the measurement signals comprising a three-dimensional (3D) representation of an environment containing material accumulation relative to the plurality ground-engaging tools, estimating an amount of material accumulation relative to the plurality of ground-engaging tools based on the 3D representation, comparing the amount of material accumulation relative to the plurality of ground-engaging tools to an accumulation threshold, the material accumulation threshold being indicative of a given degree of material accumulation relative to the plurality of ground-engaging tools, and based on the comparison between the amount of material accumulation and the accumulation threshold, controlling an operation of at least one component of the implement to execute a control action for reducing the amount of the material accumulation relative to the plurality of ground-engaging tools.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring three-dimensional (3D) material accumulation relative to one or more ground-engaging tools of a tillage implement as a tillage operation is being performed within a field. Specifically, in several embodiments, a controller of the disclosed system may be communicatively coupled to one or more accumulation sensor(s) in order to monitor the accumulation of crop residue, soil/mud, and/or other materials relative to the ground-engaging tools of the tillage implement. For example, in one embodiment, the accumulation sensor(s) may be 3D imaging sensors or ultrasound sensors that are configured to generate measurement signals that include a 3D representation of an environment containing material accumulation relative to one or of the ground-engaging tools. The controller can then estimate an amount of material accumulation relative to the plurality of ground-engaging tools (e.g. in front of the tools) based on the 3D representation.

When the amount of material accumulation exceeds a given threshold(s), the controller may be configured to execute a corrective or control action designed to reduce the amount of material accumulation relative to the ground-engaging tools, thereby reducing issues associated with the excess accumulation (such as plugging of the tools). For instance, in one embodiment, the controller may be configured to temporarily raise the ground-engaging tools relative to the ground to reduce their penetration depth and allow the material accumulated relative to the tools to break-up or otherwise be diminished. After a pre-set time period, the ground-engaging tools may then be lowered relative to the ground and returned to their original penetration depth. In another embodiment, the controller may be configured to raise the ground-engaging tools out of the ground completely and subsequently actuate the tools, such as by rotating the tools in reverse or by vibrating the tools as they are located above the ground. After actuating the tools for a given time period, the ground-engaging tools may then be lowered back into the ground and returned their original penetration depth.

Figure 1:
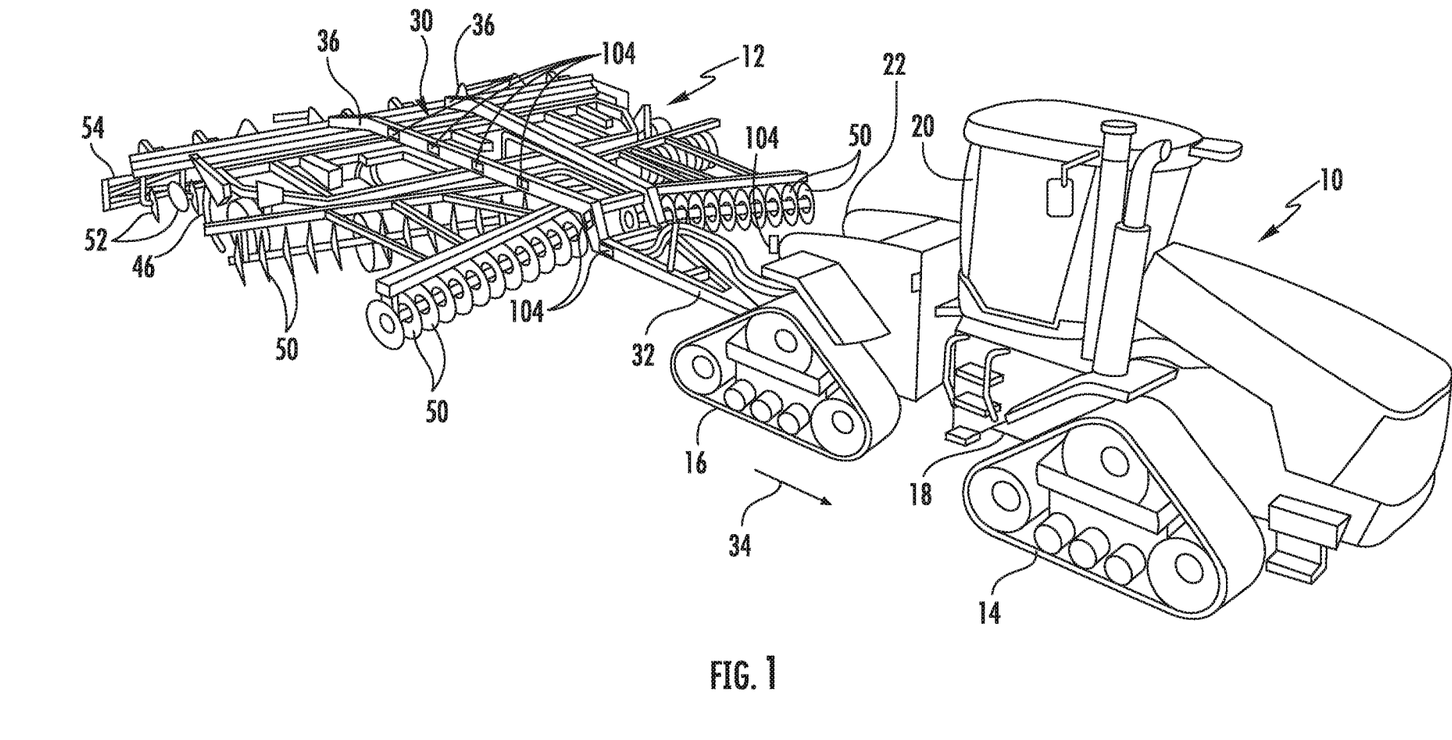
FIG. 1 illustrates a perspective view of one embodiment of a work vehicle towing an implement in accordance with aspects of the present subject matter, particularly illustrating soil roughness sensors provided in operative association with the work vehicle and the implement.
Figure 2:
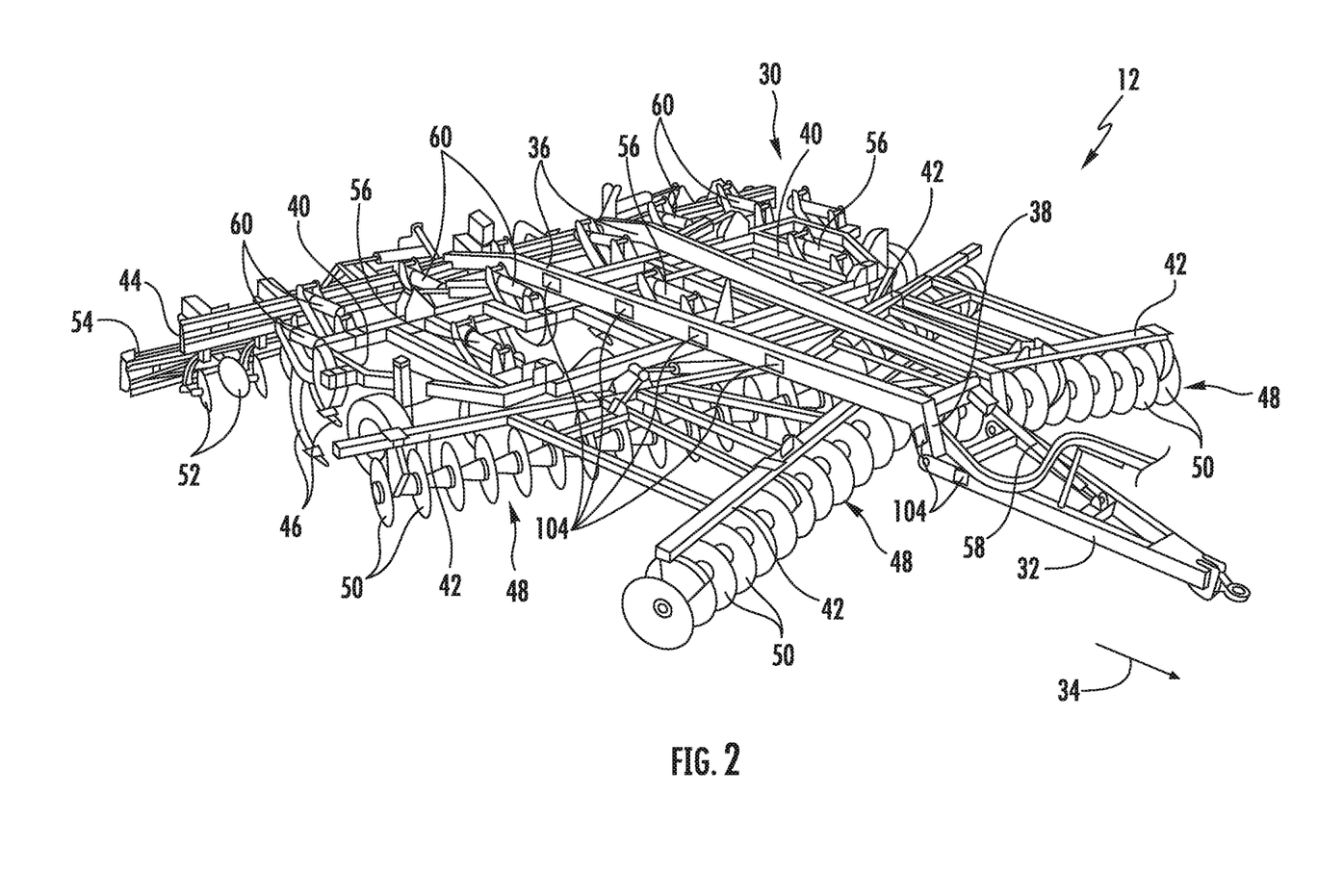
FIG. 2 illustrates a perspective view of the tillage implement shown in FIG. 1.

Referring now to drawings, FIGS. 1 and 2 illustrate perspective views of one embodiment of a work vehicle 10 and an associated implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor and the implement 12 is configured as an associated tillage implement. However, in other embodiments, the work vehicle 10 may be configured as any other suitable agricultural vehicle and/or any other suitable type of work vehicle, such as a construction vehicle. Similarly, in other embodiments, the implement 12 may be configured as any other suitable agricultural implement and/or any other suitable type of implement configured to be towed by a work vehicle.

As particularly shown in FIG. 1, the work vehicle 10 includes a pair of front track assemblies 14, a pair or rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 (FIG. 3) and a transmission 24 (FIG. 3) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Additionally, as shown in FIGS. 1 and 2, the implement 12 may generally include a carriage frame assembly 30 configured to be towed by the work vehicle via a pull hitch or tow bar 32 in a travel direction of the vehicle (e.g., as indicated by arrow 34). As is generally understood, the carriage frame assembly 30 may be configured to support a plurality of ground-engaging tools, such as a plurality of shanks, disk blades, leveling blades, basket assemblies, tines, spikes, and/or the like. In several embodiments, the various ground-engaging tools may be configured to perform a tillage operation or any other suitable ground-engaging operation across the field along which the implement 12 is being towed. It should be understood that, in addition to being towed by the work vehicle 10, the implement 12 may also be a semi-mounted implement connected to the work vehicle 10 via a two point hitch (not shown) or the implement 12 may be a fully mounted implement (e.g., mounted the work vehicle's 10 three point hitch (not shown)).

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till or otherwise engage the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the implement 12 may also include any number of suitable actuators (e.g., hydraulic cylinders) for adjusting the relative positioning, penetration depth, and/or down force associated with the various ground-engaging tools 46, 50, 52, 54. For instance, the implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the implement 12 may include one or more second actuators 58 coupled to the forward frame 42 to adjust the penetration depth and/or the down pressure of the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing any combination of shanks, disk blades, leveling blades, basket assemblies, tines, spikes, and/or the like on or more sections of the frame assembly 30. Alternatively, as opposed to the illustrated tillage implement, the implement 12 may be configured as a planting implement, a fertilizing implement and/or any other suitable type of agricultural implement.

Additionally, in accordance with aspects of the present subject matter, the work vehicle 10 and/or the implement 12 may include one or more accumulation sensors 104 coupled thereto and/or supported thereon for detecting an amount of material accumulation occurring relative to the ground-engaging tools 45, 50, 52, 54. For instance, as shown in FIG. 1, one or more accumulation sensors 104 may be provided at a rear end 22 of the work vehicle 10. In addition, as schematically shown in FIGS. 1 and 2, one or more accumulation sensor(s) 103 may be mounted to a portion of the implement 12 at any suitable location relative to the ground-engaging tools 45, 50, 52, 54 that allows the accumulation sensor(s) 108 to detect the amount of material accumulation occurring at or adjacent to such tools 45, 50, 52, 54. More specifically, as shown, one or more accumulation sensors 104 may be mounted to a front end of the implement 12, e.g. along the tow bar 32 of the implement 12. In addition, as shown, a plurality of accumulation sensors 104 may be arranged along the tow bar 32 of the implement 12, the gusset plates 38, and/or one or more of the frame members 36 of the frame assembly 30. As such, the accumulation sensor(s) 104 may be directed towards one or more of the plurality of ground-engaging tools 45, 50, 52, 54 so as to capture data associated with the amount of material accumulation in an area in front of or around one or more of the ground-engaging tools 45, 50, 52, 54 can be monitored. In addition, in several embodiments, the accumulation sensor(s) 104 may be directed in a direction opposite to the direction of travel 34 of the implement 12.

In general, the accumulation sensor(s) 104 may correspond to any suitable sensing device(s) configured to detect or capture data associated with a 3D environment containing residue accumulation on the surface of the field. For instance, in several embodiments, the accumulation sensor(s) 104 may correspond to a 3D imaging sensor (e.g. a 3D stereo imaging sensor), an ultrasound sensor, a smart sensor, a Light Detection and Imaging (LiDAR) sensor, or combinations thereof. As used herein, 3D imaging sensors generally refer to any suitable capable of generating a 3D image or representation of an object or environment. Further, as used herein, a smart sensor generally refers to any suitable sensor capable of receiving an input from an environment and used built-in processors to perform predefined functions to process data before passing the processed data along. In addition, smart sensors may also have Ethernet or Internet capabilities.

For example, in particular embodiments, the accumulation sensor(s) 104 may correspond to a suitable camera(s) configured to capture 3D images of the field surface at or adjacent to the ground-engaging tools of the implement 12, thereby allowing the residue accumulation to be estimated by analyzing the content of each image. For instance, in a particular embodiment, the accumulation sensor(s) 104 may correspond to a stereographic camera(s) having two or more lenses with a separate image sensor for each lens to allow the camera(s) to capture stereographic or 3D images. In a further embodiment, the accumulation sensor(s) 104 may correspond to any other suitable sensing device(s) configured to capture 3D images of the field surface at or adjacent to the ground-engaging tools of the implement 12. For instance, the accumulation sensor(s) 104 may correspond to an ultrasound device configured to emit ultrasound waves and detect the reflection of such waves off of the soil surface to allow the residue on the surface to be estimated.

Figure 3:
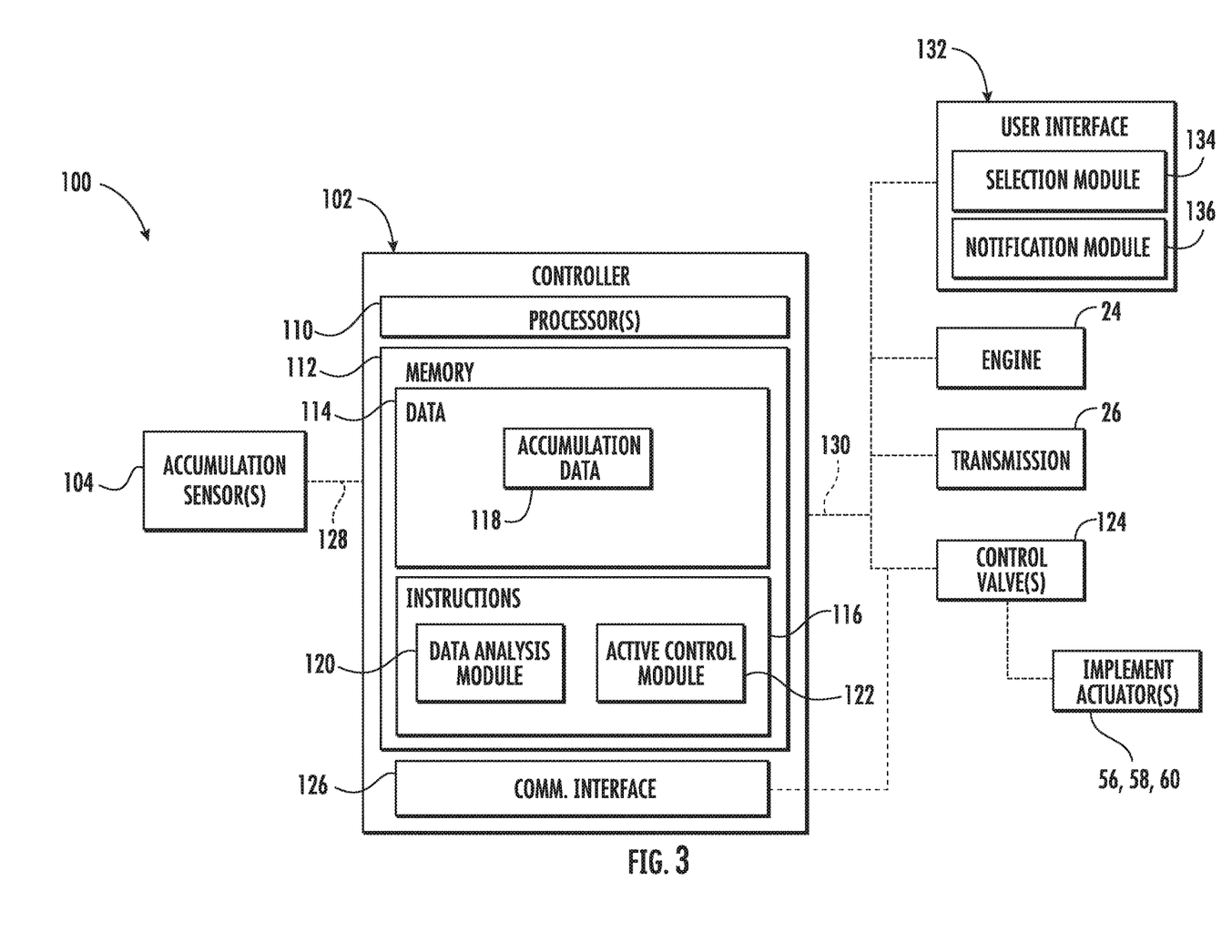
FIG. 3 illustrates a schematic view of one embodiment of a system for reducing material accumulation relative to ground-engaging tools when performing a tillage operation in accordance with aspects of the present subject matter.

Referring now to FIG. 3, a schematic view of one embodiment of a system 100 for monitoring the amount of material accumulation relative to one or more ground-engaging tools of a tillage implement is illustrated in accordance with aspects of the present subject matter. In general, the system 100 will be described herein with reference to the tillage implement 12 shown in FIGS. 1 and 2. However, in other embodiments, the disclosed system 100 may be used to reduce the amount of material accumulation occurring relative to the ground-engaging tools of any other suitable implement having any other suitable implement configuration. In addition, for purposes of description, aspects of the disclosed system 100 will be described herein as being used to reduce the amount of material accumulation occurring relative to one or more rotary tools of a tillage implement (e.g., the disc blades 36 shown in FIG. 1) during the performance of a tillage operation. However, in other embodiments, the system 100 may be used to reduce the amount of material accumulation occurring relative to any other suitable ground-engaging tools.

In several embodiments, the system 100 may include a controller 102 and various other components configured to be communicatively coupled to and/or controlled by the controller 102, such as the accumulation sensor(s) 104 described herein and/or various components of the work vehicle 10 and/or the implement 12. As will be described in greater detail below, the controller 102 may be configured to receive data from the accumulation sensor(s) 104 that is associated with the residue accumulation on the surface of the field as a ground-engaging operation is being performed. Based on an analysis of the data received from the sensor(s) 104, the controller 102 may be configured to estimate the material accumulation for the field in areas for which accumulation data was captured. In such an embodiment, the controller 102 may be configured to analyze the data to determine, for example, the residue flow past the ground-engaging tools of the implement 12. Based on the analysis, the controller 102 may also be configured to adjust the operation of the work vehicle 10 and/or the implement 12, as necessary, to reduce the residue accumulation, in general is maintained at a given target value and/or within a given target range.

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, an Electronic Control Unit (ECU), a programmable logic controller (PLC), an application specific integrated circuit, and other programmable circuits. Additionally, the memory 112 may generally comprise memory element(s) including, but not limited to, computer readable medium (e.g., random access memory (RAM)), a hard disk drive (HDD), a solid-state drive (SSD), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include an accumulation database 118 for storing residue accumulation data received from the accumulation sensor(s) 104. For example, the accumulation sensor(s) 104 may be configured to continuously or periodically capture residue accumulation data associated with the ground-engaging tools of the implement 12. In such an embodiment, the residue accumulation data transmitted to the controller 102 from the accumulation sensor(s) 104 may be stored within the accumulation database 118 for subsequent processing and/or analysis.

Moreover, in addition to the initial or raw sensor data received from the accumulation sensor(s) 104, final or post-processing roughness data (as well as any intermediate data created during data processing) may also be stored within the accumulation database 118. For example, as will be described below, the controller 102 may be configured to analyze the data received from the accumulation sensor(s) 104 using one or more data processing techniques or algorithms to determine residue accumulation values for certain ground-engaging tools 45, 50, 52, 54. In such an embodiment, the processed data generated during implementation of the data processing techniques or algorithms may be stored within the accumulation database 118.

Referring still to FIG. 3, in several embodiments, the instructions 116 stored within the memory 112 of the controller 102 may be executed by the processor(s) 110 to implement a data analysis module 120. In general, the data analysis module 120 may be configured to analyze the initial or raw sensor data captured by the accumulation sensor(s) 104 to allow the controller 102 to estimate the residue flow past the ground-engaging tools 45, 50, 52, 54. For instance, the data analysis module 120 may be configured to execute one or more suitable data processing techniques or algorithms that allows the controller 102 to accurately and efficiently analyze the sensor data, such as by applying corrections or adjustments to the data based on sensor resolution, and/or other parameters associated with the accumulation sensor(s) 104.

By processing the raw sensor data received from the accumulation sensor(s) 104, the data analysis module 120 may be configured to estimate the material accumulation at or adjacent to the ground-engaging tools 45, 50, 52, 54, e.g. to determine the residue flow past the ground-engaging tools 45, 50, 52, 54. In one embodiment, such accumulation values may then be used by the controller 102 as an input for performing one or more control actions, such as by automatically controlling the operation of the work vehicle 10 and/or the implement 12 (e.g., as will be described below).

For instance, in several embodiments, the controller 102 may be configured to compare the amount of material accumulation to one or more accumulation thresholds set for the ground-engaging tools 45, 50, 52, 54. In such embodiments, the threshold(s) may be associated with a given degree or magnitude of material accumulation relative to the ground-engaging tools 45, 50, 52, 54. Thus, when the amount of material accumulation monitored by the accumulation sensor(s) 104 reaches or passes the specific parameter value(s) associated with the accumulation threshold(s) (e.g., by falling below or exceeding the threshold value, as the case may be), the controller 102 may determine that the actual amount of material accumulation has reached or exceeded the accumulation amount associated with the accumulation threshold(s). In such instance, the controller 102 may be configured to execute a control or corrective action(s) designed to reduce the current amount of material accumulation relative to the ground-engaging tools 45, 50, 52, 54.

More specifically, as shown in FIG. 3, the instructions 116 stored within the memory 112 of the controller 102 may be executed by the processor(s) 110 to implement an active control module 122. In general, the active control module 122 may be configured to adjust the operation of the work vehicle 10 and/or the implement 12 by controlling one or more components of the vehicle 10 and/or the implement 12. Specifically, in one embodiment, when the estimated material accumulation at or adjacent to the ground-engaging tools 45, 50, 52, 54 exceeds a certain threshold, the active control module 122 may be configured to control the operation of the work vehicle 10 and/or implement 12 in a manner designed to reduce the residue on the surface of the field in one or more locations.

For example, as shown in FIG. 3, the controller 102 may include a communications interface 126 to provide a means for the controller 102 to communicate with and therefore control any of the various other system components described herein. For instance, one or more communicative links or interfaces 128 (e.g., one or more data buses or CAN buses, including ISOBUS connections) may be provided between the communications interface 126 and the accumulation sensor(s) 104 to allow material accumulation data transmitted from the sensor(s) 104 to be received by the controller 102. Similarly, one or more communicative links or interfaces 130 (e.g., one or more data buses or CAN buses, including ISOBUS connections) may be provided between the communications interface 126 and the engine 22, the transmission 24, the control valves 124, and/or the like to allow the controller 102 to control the operation of such system components.

As such, the controller 102 may be configured to implement various different control actions to adjust the operation of the work vehicle 10 and/or the implement 12 in a manner that reduces the residue accumulation on the field. For instance, the controller 102 may be configured to adjust a ground-engaging parameter associated with the ground-engaging tools 45, 50, 52, 54 of the implement 12. More specifically, as shown in FIG. 3, the controller 102 may be communicatively coupled to one or more valves 124 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 104 may automatically adjust the penetration depth, the down force, and/or any other suitable ground-engaging parameter(s) associated with the ground-engaging tools of the implement 12.

In another embodiment, the controller 102 may be configured to temporarily raise the ground-engaging tools 45, 50, 52, 54 relative to the ground to reduce the amount of material accumulation. Specifically, as shown in FIG. 3, the controller 102 may be communicatively coupled to one or more control valves 124 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 102 may automatically adjust the position of the ground-engaging tools 45, 50, 52, 54 relative the ground. For instance, when the accumulation parameter reaches or passes the accumulation threshold(s) (thereby indicating that an undesirable amount of the material accumulation currently exists), the controller 102 may be configured to control the operation of the actuator(s) 56, 58, 60 to raise the ground-engaging tools 45, 50, 52, 54 relative to the ground such that the penetration depth of the tools 45, 50, 52, 54 is reduced by a predetermined amount. Thereafter, following a pre-set time period, the controller 102 may then lower the ground-engaging tools 45, 50, 52, 54 relative to the ground to return the tools 45, 50, 52, 54 back to their original or target penetration depth.

In several embodiments, the controller 102 may be configured to execute multiple control actions. In such embodiments, the controller 102 may be configured to execute a first control action when the monitored accumulation parameter reaches or passes a first predetermined accumulation threshold and then subsequently execute a second control action when the monitored accumulation parameter reaches or passes a second predetermined accumulation threshold. Further, the first control action may differ from the second control action. For example, in one embodiment, the first control action may include temporarily reducing a penetration depth of one or more of the plurality of ground-engaging tools 45, 50, 52, 54 for a predetermined period of time, whereas the second control action may include raising the plurality of ground-engaging tools 45, 50, 52, 54 out of the ground and subsequently actuating the plurality of ground-engaging tools 45, 50, 52, 54.

In another embodiment, the controller 102 may be configured to execute a control action in which the ground-engaging tools 45, 50, 52, 54 are raised completely out of the ground and then subsequently actuated to reduce the amount of material accumulation relative thereto. For example, in embodiments in which the ground-engaging tools correspond to rotary tools (e.g., disc blades 36), the controller 102 may be configured to raise the ground-engaging tools 45, 50, 52, 54 out of the ground (e.g., by controlling the operation of the actuators) and subsequently rotate the tools 45, 50, 52, 54 in reverse (i.e., in a direction opposite the rotational direction of such tools 45, 50, 52, 54 when engaging the ground during the performance of a tillage operation). Such reverse rotation of the ground-engaging tools 45, 50, 52, 54 may be used to scrape or fling off the accumulated material. For instance, one or more fixed scrapers (not shown) may be provided adjacent to each ground-engaging tool 45, 50, 52, 54, such as by positioning a double-edged, fixed scraper adjacent to each disc blade 36 (e.g., a first scraper edge positioned for scraping material from the tool during normal operation and a second scraper edge positioned for scraping material from the tool during reverse rotation). In such an embodiment, by raising the tools 45, 50, 52, 54 out of the ground and reversing their rotation, the tools 45, 50, 52, 54 may be rotated relative to the associated scraper(s) in a manner that scrapes or knocks-off the accumulated material.

To allow for such reverse rotation of the ground-engaging tools 45, 50, 52, 54, it should be appreciated that the system 100 may include one or more rotational actuators (e.g., one or more hydraulic or electric motors) coupled to the tools 45, 50, 52, 54. In such an embodiment, each rotational actuator may be coupled to one or more of the tools 45, 50, 52, 54 via a clutch to allow the actuator to be decoupled from the tool(s) 45, 50, 52, 54 when the implement 12 is being used to perform a tillage operation. Additionally, the system controller 102 may be communicatively coupled to the rotational actuator(s) to allow the controller 102 to electronically control the operation of each actuator. Thus, the controller 102 may be configured to initially control the operation of the actuator(s) to raise the tools 45, 50, 52, 54 out of the ground and the subsequently control the operation of each rotational actuator (and associated clutch) to allow the tools 45, 50, 52, 54 to be rotated in the reverse direction. After rotating the tools 45, 50, 52, 54 for a given time period, the tools 45, 50, 52, 54 may then be lowered relative to the ground and returned back to their original or target penetration depth.

In another embodiment, upon raising the ground-engaging tools 45, 50, 52, 54 out of the ground, the controller 102 may be configured to vibrate the tools 45, 50, 52, 54 to reduce the amount of material accumulation thereon. For example, the controller 102 may be communicatively coupled to one or more vibrational actuators configured to oscillate or vibrate the tools 45, 50, 52, 54. In such an embodiment, the controller 102 may be configured to initially control the operation of the actuator(s) 56, 58, 60 to raise the ground-engaging tools 45, 50, 52, 54 out of the ground and the subsequently control the operation of the vibrational actuator(s) in order to vibrate the tools 45, 50, 52, 54. After vibrating the ground-engaging tools 45, 50, 52, 54 for a given time period, the tools 45, 50, 52, 54 may then be lowered relative to the ground and returned back to their original or target penetration depth.

Still referring to FIG. 3, the system 100 may also include a user interface 132, for example, within the work vehicle 10. In such embodiments, the user interface 132 may include a selection module 134 configured to receive a selection from a user indicative of one or more desired control actions to be executed by the controller 102. As such, a user of the work vehicle 10 can select which control actions to implement based on the sensor data from the accumulation sensor(s) 104. In addition, the controller 102 may be configured to generate a notification to a user via a notification module 136 that indicates when the amount of material accumulation exceeds the accumulation threshold(s). The user interface 132 described herein may include, without limitation, a keyboard, a keypad, a pointing device, a touch sensitive screen, a remote mobile device, and/or an audio input device.

Figure 4:
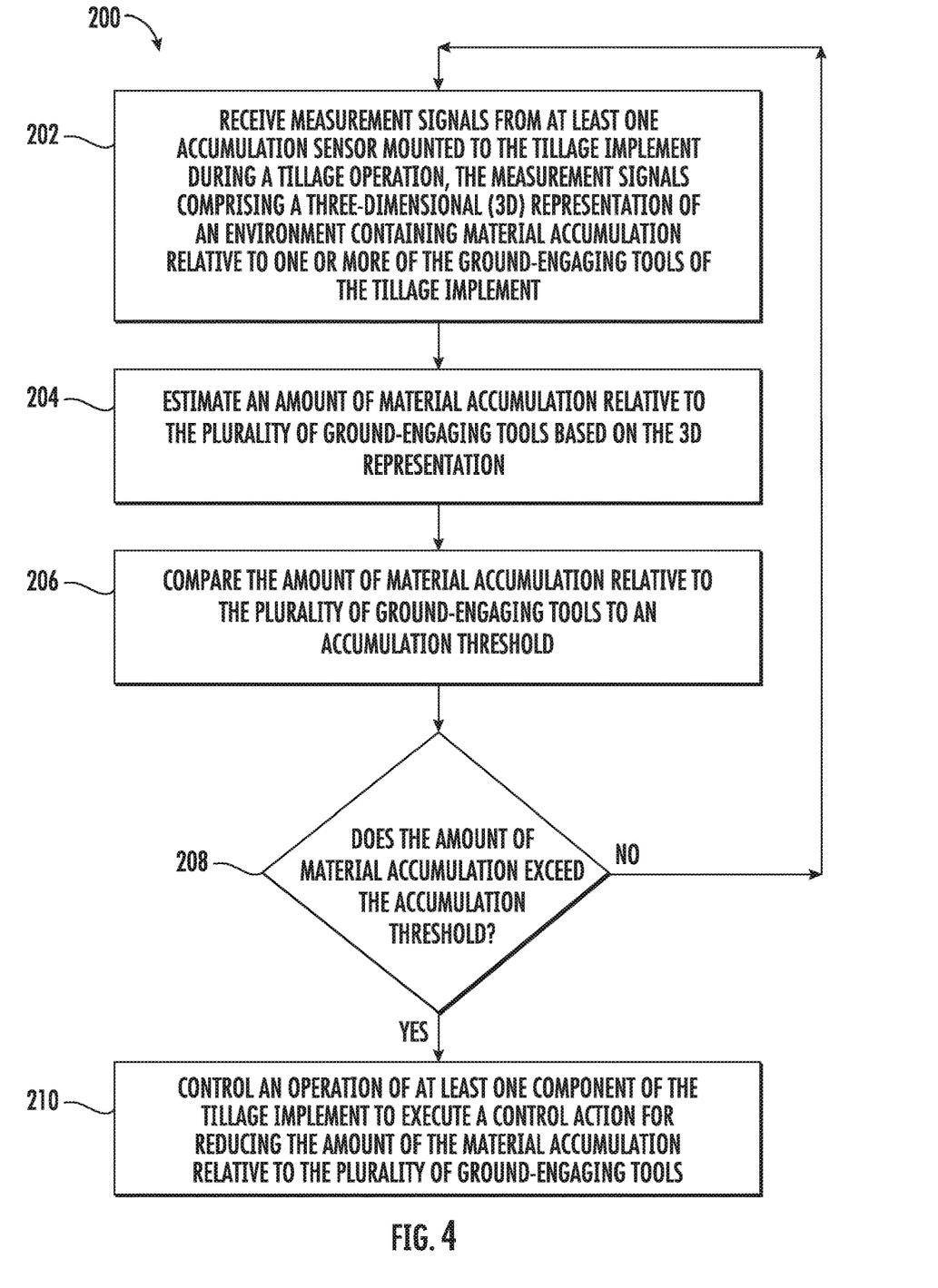
FIG. 4 illustrates a flow diagram of one embodiment of a method for reducing material accumulation relative to ground-engaging tools when performing a tillage operation in accordance with aspects of the present subject matter.

Referring now to FIG. 4, a flow diagram of a specific embodiment of a control algorithm 200 that may be executed for reducing the material accumulation relative to ground-engaging tools of a tillage implement is illustrated in accordance with aspects of the present subject matter. In general, the control algorithm 200 will be described herein with reference to the tillage implement 12 shown in FIGS. 1 and 2 as well as the system 100 shown in FIG. 3. However, in other embodiments, the algorithm 200 may be used in connection with any other suitable implement having any other suitable implement configuration and/or with any other suitable system having any other suitable system configuration.

It should be appreciated that, although FIG. 4 depicts control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown in FIG. 4, at (202), the method 200 includes receiving measurement signals from the accumulation sensor(s) 104 mounted to the tillage implement 12 during a tillage operation. More specifically, the measurement signals may include a 3D representation of an environment containing material accumulation in the field relative to one or more of the ground-engaging tools 45, 50, 52, 54. In one embodiment, the measurement signals from the accumulation sensor(s) 104 may also include information indicative of material accumulation flow past the plurality of ground-engaging tools 45, 50, 52, 54, material accumulation type, density of the material accumulation, moisture content of the material accumulation, and/or any other parameters of the material accumulation.

Moreover, as shown in FIG. 4, at (204), the controller 102 may also be configured to estimate an amount of material accumulation relative to the plurality of ground-engaging tools 45, 50, 52, 54 based on the 3D representation. Further, as shown in FIG. 4, at (206), the controller 102 may be configured to compare the amount of material accumulation to one or more accumulation threshold(s) as described herein. As mentioned, the material accumulation threshold is indicative of a given degree of material accumulation relative to the plurality of ground-engaging tools 45, 50, 52, 54. For example, in one embodiment, the given degree of the material accumulation may be set such that accumulation values above the threshold can lead to plugging of the ground-engaging tools 45, 50, 52, 54.

As shown at (208), the controller 102 is configured to determine whether the amount of material accumulation exceeds the accumulation threshold. If the amount of material accumulation remains below the accumulation threshold, the controller 102 is configured to continue monitoring the material accumulation without further action. However, if the amount of material accumulation exceeds the accumulation threshold, as shown at (210), the controller 102 is configured to control an operation of at least one component of the tillage implement 12 to execute a control action for reducing the amount of the material accumulation, thereby preventing plugging of the ground-engaging tools 45, 50, 52, 54. In certain embodiments, as mentioned, the control action may include adjusting a penetration depth of one or more of the plurality of ground-engaging tools 45, 50, 52, 54 for a predetermined period of time. In additional or alternative embodiments, the control action may include raising the plurality of ground-engaging tools 45, 50, 52, 54 out of the ground. It should be further understood that the control action(s) may be any suitable combination of control actions as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing material accumulation relative to a plurality of ground-engaging tools of a tillage implement, the method comprising:

receiving, with a computing device, measurement signals from at least one accumulation sensor mounted to the tillage implement during a tillage operation, the measurement signals comprising a three-dimensional (3D) representation of an environment containing material accumulation relative to one or more of the ground-engaging tools of the tillage implement, the material accumulation comprising an accumulation of field materials relative to the one or more of the ground-engaging tools;

estimating, with the computing device, an amount of material accumulation relative to the plurality of ground-engaging tools based on the 3D representation;

comparing, with the computing device, the amount of material accumulation relative to the plurality of ground-engaging tools to first and second predetermined accumulation thresholds, the first predetermined accumulation threshold differing from the second predetermined accumulation threshold such that the first and second predetermined accumulation thresholds are indicative of respective first and second degrees of material accumulation relative to the plurality of ground-engaging tools, the second degree of material accumulation corresponding to a greater amount of material accumulation relative to the first degree of material accumulation; and controlling, with the computing device, an operation of at least one component of the tillage implement to sequentially execute first and second control actions for reducing the amount of the material accumulation relative to the plurality of ground-engaging tools, with such control of the at least one component comprising:

executing the first control action when the amount of material accumulation relative to the plurality of ground-engaging tools reaches or passes the first predetermined accumulation threshold;

determining that the amount of material accumulation relative to the plurality of ground-engaging tools has reached or passed the second predetermined accumulation threshold following execution of the first control action; and subsequently executing the second control action to reduce the amount of material accumulation relative to the plurality of ground-engaging tools, wherein the first control action differs from the second control action.

2. The method of claim 1, wherein the measurement signals from the at least one accumulation sensor further comprise information indicative of at least one of material accumulation flow past the plurality of ground-engaging tools, material accumulation type, density of the material accumulation, or moisture content of the material accumulation.

3. The method of claim 1, wherein the at least one accumulation sensor comprises at least one of a three-dimensional (3D) imaging sensor, a Light Detection and Imaging (LiDAR) sensor, an ultrasound sensor, a smart sensor, or combinations thereof.

4. The method of claim 1, further comprising:
mounting the at least one accumulation sensor to a front end of the tillage implement;
directing the at least one accumulation sensor towards one or more of the plurality of ground-engaging tools; and
monitoring the amount of material accumulation in an area in front of one or more of the ground-engaging tools.

5. The method of claim 1, wherein one of the first control action or the second control action comprises adjusting a penetration depth of one or more of the plurality of ground-engaging tools for a predetermined period of time.

6. The method of claim 1, wherein one of the first control action or the second control action comprises raising the plurality of ground-engaging tools out of the ground.

7. The method of claim 1, wherein executing the first control action comprises temporarily reducing a penetration depth of one or more of the plurality of ground-engaging tools for a predetermined period of time, and wherein executing the second control action comprises raising the plurality of ground-engaging tools out of the ground.

8. The method of claim 1, further comprising generating, with the computing device, a notification indicative of the amount of material accumulation exceeding at least one of the first accumulation threshold or the second accumulation threshold.

9. The method of claim 1, wherein the implement includes a frame, a first actuator configured to raise one or more of the plurality of ground-engaging tools to a raised position above the ground, and a second actuator configured to actuate the one or more ground-engaging tools while the one or more of the plurality of ground-engaging tools are located at the raised position, and wherein:

executing the first control action comprises controlling the operation of the first actuator to reduce a penetration depth of the one or more ground-engaging tools; and executing the second control action comprises:
controlling the operation of the first actuator to raise the one or more ground-engaging tools to the raised position above the ground; and
controlling the operation of the second actuator to actuate the one or more ground-engaging tools while the one or more ground-engaging tools are located at the raised position to reduce the amount of material accumulation relative to the one or more ground-engaging tools.

10. The method of claim 9, wherein the first actuator comprises a hydraulic cylinder and the second actuator comprises one of a vibrational actuator or a rotational actuator.

11. The method of claim 9, wherein controlling the operation of the second actuator comprises controlling the operation of the second actuator to vibrate the one or more of the plurality of ground-engaging tools while the one or more ground-engaging tools are located at the raised position.

12. The method of claim 9, wherein the one or more ground-engaging tools comprises one or more rotary ground-engaging tools, wherein controlling the operation of the second actuator comprises controlling the operation of the second actuator to rotate the one or more rotary ground-engaging tools in reverse relative to a rotational direction of the one or more rotary ground-engaging tools when the one or more rotary ground-engaging tools are engaging the ground.

13. A system for reducing material accumulation relative to ground-engaging tools when performing a tillage operation, the system comprising:
an implement including a frame and a plurality of ground-engaging tools supported on the frame;
an ultrasound sensor mounted to the implement; and
a controller including a processor and associated memory, the memory including instructions that, when implemented by the processor, configure the controller to perform one or more operations, the one or more operations comprising:
receiving ultrasound data from the ultrasound sensor during the tillage operation, the ultrasound data providing a three-dimensional (3D) representation of an environment extending upwardly from a surface of the ground that contains material accumulation relative to at least one of the plurality of ground-engaging tools, the material accumulation comprising an accumulation of field materials on or above the surface of the ground relative to the one or more of the ground-engaging tools;
estimating an amount of material accumulation relative to the at least one of the plurality of ground-engaging tools based on the ultrasound data;
comparing the amount of material accumulation relative to the at least one of the plurality of ground-engaging tools to an accumulation threshold, the material accumulation threshold being indicative of a given degree of material accumulation relative to the at least one of the plurality of ground-engaging tools; and
based on the comparison between the amount of material accumulation and the accumulation threshold, controlling an operation of at least one component of the implement to execute a control action for reducing the amount of the material accumulation relative to the at least one of the plurality of ground-engaging tools.

14. The system of claim 13, wherein the accumulation threshold comprises a first predetermined accumulation threshold and a second predetermined accumulation threshold, and wherein control of the at least one component comprises:
- executing a first control action when the amount of material accumulation relative to the at least one of the plurality of ground-engaging tools reaches or passes the first predetermined accumulation threshold; and
- subsequently executing a second control action when the amount of material accumulation relative to the at least one of the plurality of ground-engaging tools reaches or passes the second predetermined accumulation threshold,
- wherein the first control action differs from the second control action.

15. The system of claim 13, further comprising a first actuator configured to raise the at least one of the plurality of ground-engaging tools to a raised position above the ground, and a second actuator configured to actuate the at least one of the plurality of ground-engaging tools while the at least one of the plurality of ground-engaging tools is located at the raised position; and
- wherein the control of the at least one component comprises:
- controlling the operation of the first actuator to raise the at least one of the plurality of ground-engaging tools to the raised position above the ground; and
- controlling the operation of the second actuator to actuate the at least one of the plurality of ground-engaging tools while the at least one of the plurality of ground-engaging tools is located at the raised position to reduce the amount of material accumulation relative to the at least one of the plurality of ground-engaging tools.

* * * * *